Dec. 4, 1951  E. O. JOHNSTON  2,577,330
AIRPLANE GROUND LOCK
Filed July 28, 1949

Inventor
Elmer O. Johnston
Attorneys

Patented Dec. 4, 1951

2,577,330

UNITED STATES PATENT OFFICE 2,577,330

AIRPLANE GROUND LOCK

Elmer O. Johnston, Oreana, Idaho

Application July 28, 1949, Serial No. 107,297

7 Claims. (Cl. 188—32)

This invention appertains to a collapsible wheel chock and has for its primary object to anchor an airplane to the ground, when the wind is blowing or when the engines of the plane are being warmed up.

Another important object of this invention is to automatically lock the wheels of an airplane to the ground, with the wheels onto the chock.

Another important object of this invention is to grip the tire of the airplane wheel so that vibration of the airplane will not cause the plane to move.

Another important object of this invention is to provide a collapsible and compact chock, which will efficiently anchor an airplane to the ground and which cannot be vibrated loose or caused to slide over the ground, responsive to vibration of the airplane engine or the like.

Another object of this invention is to provide a portable and compact collapsible chock, which may be employed for anchoring any type of wheeled machine or vehicle, the same functioning automatically to grip the wheels of the vehicle, when the wheels are moved thereon.

These and ancillary objects and structural features of merit are attained by this invention, a preferred embodiment of which is set forth in the following description and illustrated in the accompanying drawing, wherein.

Referring now more particularly to the accompanying drawings, this invention, generally designated by the character reference 10 is constructed to grip upon and clamp onto the upper portion of the tread section of a pneumatic tire 12 for a wheel 14. Of course, any type of wheel construction may be held by the chock, the wheel illustrated in Figure 1 being by way of example only.

Figure 3:
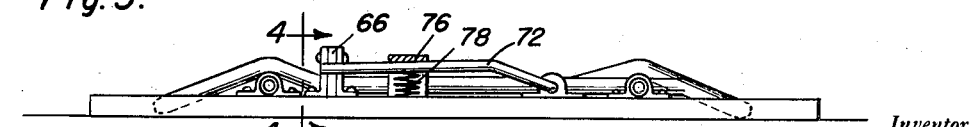
Figure 3 is a side elevational view thereof, with the chock depicted in a collapsed inoperative position.

The collapsible wheel chock, 10, includes a pair of parallel longitudinally extending transversely spaced base strips or bed members 16 and 18. Of course, the base or bed may be formed from one member, instead of the two parallel strips illustrated. A shaft 20 extends transversely between the base strips 16 and 18 and has its opposing ends rotatably journaled in bearing brackets 22 anchored on the strips. A pair of L-shaped arms 24 and 26 extend integrally from the shaft 20, the arms projecting outwardly in parallelism from the shaft and having their lateral sections 28 and 30 directed inwardly relative to each other. It is to be noted that the longitudinal sections of the arms are formed with offset ends, 32, with respect to the longitudinal plane of the arms, the lateral ends 28 and 30 extending from the offset ends 32 of the arms. Springs 34 and 36 are coiled concentrically about the opposing end of the shaft 20 between the U-shaped bearing bracket and have one end secured as at 38 and 40 to the bed members. The opposing ends 42 and 44 of the springs bear against the arms 24 and 26, adjacent their inner secured ends. A pair of complementary arms 46 and 48 are formed with lateral outwardly extending ends 50 and 52 which are rotatively anchored by U-shaped bearing brackets 54 onto the base strips. The brackets 54 are spaced longitudinally from the brackets 22, the longitudinal distance between the brackets being equal to the length of the arms 46 and 48, so that the opposing laterally directed ends 56 and 58 which extend in the opposite direction from the ends 50 and 52 lay adjacent to the shaft 20, when the arms are in a lowered position. The arm ends 56 and 58 are offset from the main portion of the arms 46 and 48 so as to overlie the shaft 20, as seen in Figure 3. A pair of rods or bars 60 are secured to the arms 48 and 26 and are spaced outwardly therefrom, the bars extending parallel with the longitudinal sections of the arms to define guideways for a pair of fingers 62, which extend laterally from the arms 24 and 46 and are slidably disposed between the arms 26 and 48 and the bars 60. The fingers function to urge the arms 26 and 48 upwardly responsive to upward swinging movement of the arms 24 and 48, which are swung upwardly by the springs. An angle member 64 is secured to the bar 48 and extends laterally therefrom. A retaining arm 66 is pivotally secured by a pivot pin 68 between a pair of upstanding arms 70, which are anchored to the base strip 18. The arm 66 is adapted for vertical swinging movement about a horizontal axis and is formed with a latch end 73 adapted to seat on the horizontal width of the angle member 64 and retain all of the arms in a collapsed or lowered position.

Figure 1:
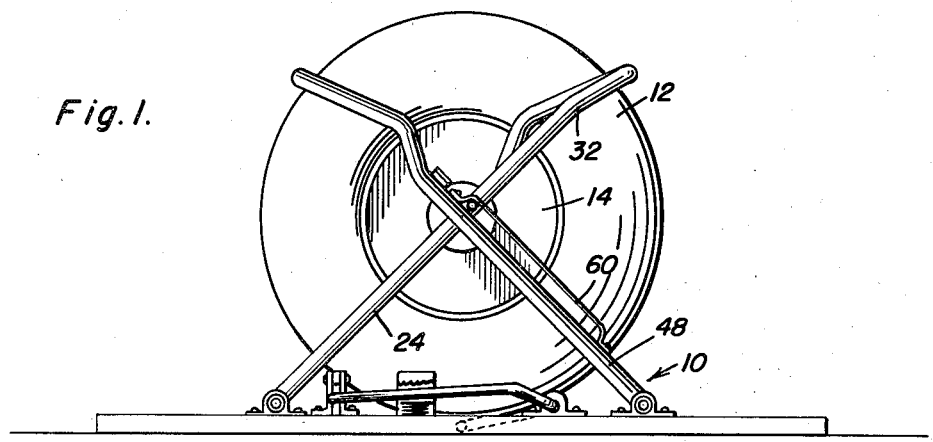
Figure 1 is a side elevational view of a device constructed in accordance with the principles of this invention and illustrating the same in operative anchoring engagement on the tire of a wheel.
Figure 2:
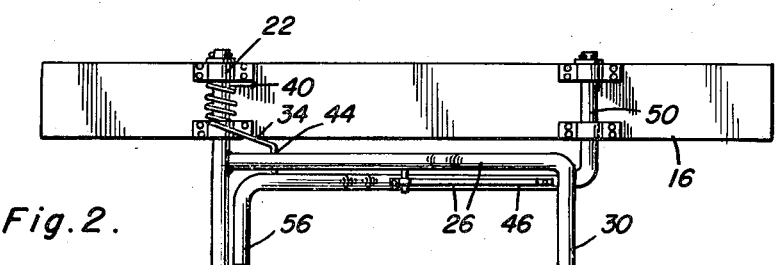
Figure 2 is a top plan view of the embodiment illustrated in Figure 1.
Figure 4:
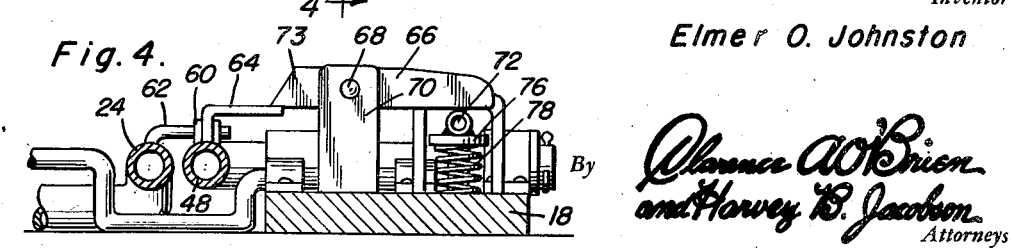
Figure 4 is an enlarged detail view taken on line 4—4 of Figure 3.

A trigger rod 72, which is substantially U-shaped and is formed at one end with a lateral extension 74 disposed transversely between the base strips, is provided to retain the arm 66 in latching engagement with the angle member 64 and to therefore retain the arms in a collapsed position, the latching arm 66 being released responsive to movement of a wheel onto the trigger rod. In this respect, the trigger rod is formed with a lateral extension 74 disposed transversely between the base strips and which is adapted to receive the weight of the wheel. The opposing end of the trigger rod is disposed between a U-shaped bracket 80 and is formed with a plate 76 secured to the underside thereof. A coil spring 78 is disposed between the base strip 18 and the plate 76 functions to urge the trigger rod upwardly into retaining engagement of the arm 66, as seen in Figure 4. It is to be noted that the lateral extension 74 is offset from the journaled portion 82 of the trigger rod, the journal portion being rotatably disposed in bearings 84 secured to the base strip. Thus, as the wheel moves onto the extension 74, the opposing end of the trigger rod is moved downwardly against the urgement of the spring 78 and the springs on the transverse rod 20 function to raise the arms, the latch member 74 pivoting the retaining arm about its pivot and enabling all of the arms to move upwardly and to clamp upon the tire of the wheel, as seen in Figure 1.

Having described the invention, what is claimed as new is:

1. A chock for use with a wheel of a machine, the wheel having a tire with a tread, said chock comprising a bed member adapted to be positioned on the ground, a pair of arms pivotally mounted at one end on the member, the pivoted ends of the arms being spaced apart, the opposite ends of the arms being provided with tire tread contacting portions which extend at an angle and which are offset with respect to the remainder of the arms, means for normally retaining said arms in a folded position on the bed member, release means for said retaining means actuated by the wheel of the machine, and means responsive to said foregoing means for urging the arms and the thread contacting portions upwardly into complementary clamping engagement on the upper portions of the tire tread of the wheel.

2. The combination of claim 1, wherein said last means is operatively connected to one of said arms and interconnecting means is associated with said arms.

3. The combination of claim 1, wherein said retaining means includes a plate extending laterally from one of the arms, a locking arm pivotally mounted centrally on the bed member for vertical swinging movement, one end of said arm being engageable on the plate.

4. In a wheel chock, a bed member, a pair of retaining arms pivotally mounted at one end on the member, said pivoted ends being longitudinally spaced apart, said arms being formed with unattached angular ends and adapted to be normally folded flat on the bed member, latch means for retaining the arms in a folded position, releasable retaining means operatively associated with said latch means, said retaining means being actuated to release the latch means in response to movement of a wheel onto the bed member between the unattached ends of the folded arms and means operatively connected to the arms for urging the arms into a raised position with said angular ends embracing the wheel.

5. The combination of claim 4, wherein said last means includes a spring connected between the bed member and one of the arms, said last arm having a lateral finger slidably connected to the other arm for raising the same simultaneously with said first arm.

6. The combination of claim 4, wherein said releasable retaining means includes a trigger bar pivotally mounted on the bed member and having one end position between the unattached ends of the retaining arms, the opposing end of the bar being lockingly engageable with the latch means, and means for retaining said end in said engagement.

7. The combination of claim 6, wherein said last means includes a U-shaped bracket formed on the bed member and embracing the bar, resilient means secured to the bed member and vertically disposed in the bracket to retain the bar in abutting relation with the web of the bracket.

ELMER O. JOHNSTON.

REFERENCES CITED

The following references are of record in the file of this patent:

UNITED STATES PATENTS

| Number | Name | Date |
|---|---|---|
| 2,285,989 | Kroll | June 9, 1942 |
| 2,500,130 | Lehn | Mar. 7, 1950 |